United States Patent [19]

Demers et al.

[11] Patent Number: 5,840,256
[45] Date of Patent: Nov. 24, 1998

[54] PLATE FOR REACTION SYSTEM

[75] Inventors: Robert Richard Demers; Satyam Choudary Cherukuri, both of Cranbury; Aaron Wiliam Levine, Mercer; Kerry Dennis O'Mara, Burlington, all of N.J.

[73] Assignee: David Sarnoff Research Center Inc., Princeton, N.J.

[21] Appl. No.: 630,018

[22] Filed: Apr. 9, 1996

[51] Int. Cl.$^6$ ........................................................ B01L 11/00
[52] U.S. Cl. ...................... 422/102; 422/82.05; 422/101; 422/104; 436/809; 356/246; 204/299 R; 204/600
[58] Field of Search ..................................... 422/100–104, 422/82.05; 356/246, 427, 440; 204/299 R, 600, 601; 436/809

[56] References Cited

U.S. PATENT DOCUMENTS

| | | |
|---|---|---|
| 4,676,274 | 6/1987 | Brown ...................................... 137/806 |
| 4,753,775 | 6/1988 | Ebersole et al. ........................... 422/81 |
| 4,891,120 | 1/1990 | Sethi et al. ........................... 204/299 R |
| 4,908,112 | 3/1990 | Pace .................................... 204/299 R |
| 4,960,486 | 10/1990 | Perkins et al. ........................... 156/633 |
| 4,966,646 | 10/1990 | Zdeblick ................................. 156/633 |
| 4,999,286 | 3/1991 | Gawel et al. ........................... 435/7.32 |
| 5,038,852 | 8/1991 | Johnson et al. ........................... 165/12 |
| 5,073,029 | 12/1991 | Eberly et al. ........................... 356/432 |
| 5,100,627 | 3/1992 | Buican et al. ........................... 422/108 |
| 5,118,384 | 6/1992 | Harmon et al. ........................... 156/643 |
| 5,141,719 | 8/1992 | Fernwood et al. ....................... 422/101 |
| 5,141,868 | 8/1992 | Shanks et al. ........................... 435/288 |
| 5,175,209 | 12/1992 | Beattie et al. ........................ 525/54.11 |
| 5,178,190 | 1/1993 | Mettner ............................... 137/625.65 |
| 5,250,263 | 10/1993 | Manz ....................................... 422/81 |
| 5,252,294 | 10/1993 | Kroy et al. ............................. 422/102 |
| 5,256,376 | 10/1993 | Callan et al. ........................... 422/102 |
| 5,262,127 | 11/1993 | Wise et al. ............................... 422/98 |
| 5,453,359 | 9/1995 | Gargan et al. ............................. 435/13 |
| 5,463,564 | 10/1995 | Agrafiotis et al. ...................... 364/496 |
| 5,480,614 | 1/1996 | Kamahori ................................. 422/70 |
| 5,529,756 | 6/1996 | Brennan ................................. 422/131 |
| 5,599,695 | 2/1997 | Pease et al. ........................... 435/91.1 |

*Primary Examiner*—Harold Y. Pyon
*Attorney, Agent, or Firm*—William J. Burke

[57] ABSTRACT

The invention provides a plate having a plurality uniformly sized reaction cells formed in its upper surface, wherein the density of the reaction cells is at least about 10 cells per cm$^2$. Preferably, the area of each of the openings of the reaction cells is no more than about 55% of the area defined by the multiplication product of (1) the pitch between reaction cells in separate rows and (2) the pitch between reaction cells in separate columns.

21 Claims, 4 Drawing Sheets

| FORMAT | 1K-120 | 4K-120 | 10K-50 | 100K-10 |
|---|---|---|---|---|
| MATRIX | 1024 CELLS | 4096 CELLS | 10,000 CELLS | 99,856 CELLS |
| RELATIVE SUBSTRATE SIZE | 3 INCH SQUARE | 4 INCH SQUARE | 4 INCH SQUARE | 7.25 INCH SQUARE |
| RELATIVE CELL LAYOUT μm | 2260 / 2260 / 890 SQUARE CELL | 1488 / 1488 / 890 SQUARE CELL | 965 / 635 SQUARE CELL | 558 / 400 SQUARE CELL |

PLATE FOR REACTION SYSTEM

The present invention relates to a plate having formed thereon numerous small-scaled reaction cells (or wells) that are formatted to allow the cells to be individually addressed despite their small size, to allow each cell to accommodate a substrate for reactions, to allow each cell to be separately illuminated for optical detection, and to allow sufficient material between reaction cells to support the formation of an appropriate seal between the plate and an ancillary device, for instance a liquid distribution device that delivers reagents to the reaction cells.

Recent advances in microfluidics, i.e., the small-scale transfer of liquid among compartments, have made it possible to conduct reactions such as syntheses or assays in very small-scale devices. See, for instance, Zanzucchi et al., "Liquid Distribution System," U.S. patent application Ser. No. 08/556,036, filed Nov. 9, 1995. Such devices allow the programming of the concurrent operation of thousands of separate reactions. Pursuant to the Zanzucchi et al. patent application, such an apparatus can be used to distribute various liquids to thousands of reaction cells, which reaction cells can be fabricated on a plate.

In recent years, drug discovery programs have focused on the use of microtiter plates having 96 or 384 cells to assay prospective pharmaceuticals in an in vitro model for a pharmaceutical activity or for conducting small-scale syntheses in parallel. The devices provided for by the advances in microfluidics, however, are to be used to conduct reactions at, for example, 1,000, 10,0000, 100,000 or more reaction sites or cells. By the present invention, these sites or cells are located on a plate. In attempting to operate at the scale implied by these numbers of reaction cells, one must take into account, among other things, (1) the need to form seals that allow fluid to be transferred to each cell without cross-contamination from fluid intended for another cell, (2) the need to provide a cell aperture widths sufficient to facilitate fluid transfer, (3) the need for the cells to have sufficient cross-sectional area and volume to allow for optical detection, (4) the need to have a relatively compact plate that is easily stored and operates with a liquid distribution device that moves liquids through relatively compact distances and (5) the need for sufficient alignment and cell separation to allow the cells to be individually identified. By the present invention, these needs are met with a "nanotiter" or "small-scaled" plate having reaction cells that are densely packed.

SUMMARY OF THE INVENTION

The invention provides a plate having a plurality uniformly sized reaction cells formed in its upper surface, wherein the density of the reaction cells is at least about 10 cells per $cm^2$. Preferably, the reaction cells are arrayed in rows and columns. Also, preferably, the plate is rectangular, preferably with the rows and columns of cells parallel to the edges of the plate. Preferably, the area of each of the openings (i.e., apertures) of the reaction cells is no more than about 55% of the area defined by the multiplication product of (1) the pitch between reaction cells in separate rows and (2) the pitch between reaction cells in separate columns. More preferably, this aperture area is no more than about 50%, yet more preferably 45%, of the area defined by the multiplication product of (1) the pitch between reaction cells in separate rows and (2) the pitch between reaction cells in separate columns. Preferably, the density of cells is no more than about 350 per $cm^2$, more preferably no more than about 150 per $cm^2$, yet more preferably no more than about 120 per $cm^2$. Preferably, the density of cells is at least about 20 cells per $cm^2$, more preferably at least about 40 cells per $cm^2$, still more preferably at least about 100 cells per $cm^2$.

Preferably, on the plate, the pitch between reaction cells in a row or column is at least about 0.5 mm, more preferably at least about 0.9 mm. Preferably, each reaction cell is separated from each adjacent reaction cell by at least about 0.15 mm, more preferably by at least about 0.3 mm. Preferably, each reaction cell has a substantially square shape. Preferably, the plate has at least about 1,000 reaction cells, more preferably at least about 4,000 reaction cells, yet more preferably at least about 10,000 reaction cells. Preferably, the plate has a patterned gasket on its upper surface.

Preferably, the plate is designed to facilitate alignment by having a first marker on a first edge of the plate, wherein the marker is for orienting the reaction cells. Preferably, the plate has a second marker on a second edge of the plate perpendicular to the first edge, wherein the second marker is for orienting the reaction cells. More preferably, the plate has a third marker on the second edge, wherein the third marker is for orienting the of reaction cells. Preferably, the first, second and third markers are notches designed to interact with locating pins used to mechanically orient the reaction cells. Alternatively or supplementally, the plate has two optical reference structures, more preferably three, for orienting a device, such as an optical detector, relative to the reaction cells. The optical reference structures are preferably separated by at least about 4 cm. Preferably, the optical reference structures are etched into the plate.

The invention also provides a reaction system for conducting a plurality of reactions in parallel, the reaction system comprising a liquid distribution system for addressably directing a plurality of liquids to a plurality of cells, and a plate as described above.

The invention additionally provides method of conducting a plurality of reactions in parallel comprising operating a liquid distribution system for addressably directing a plurality of liquids to a plurality of cells, wherein the cells are located on one of the above-described plates that is reversibly sealed to the liquid distribution system.

The invention further provides a method of forming a gasket on the top surface of a substrate, the method comprising: patterning a layer of photoresist on the top surface so that there are cleared surface areas and photoresist-coated areas; applying an elastomeric gasket material to the cleared areas; and removing the photoresist from the photoresist-coated areas. Preferably, the applying step comprises placing the elastomeric gasket material on the top surface; and compression-molding the gasket material into the cleared areas. Preferably, after the compression-molding and before the photoresist removal, the gasket material is cured. The gasket material is preferably silicone. The substrate preferably has a smooth surface, more preferably a flat surface. The method is preferably applied to a plate on which structures, particularly microstructures, have been formed.

DEFINITIONS

The following terms shall have the meaning set forth below:

addressable

Cells are addressable if each cell of a plate can be individually located and its contents manipulated.

Alignment

"Alignment" refers to the coordinated positioning of the cells of a small-scaled plate of the invention and another device with which the small-scaled plate will operate. Thus, the small-scaled plate is aligned with a liquid distribution system if the liquid distribution system is positioned to deliver liquid to each of the cells of the small-scaled plate. Similarly, the small-scaled plate is aligned with an optical detection device if the device can focus light on each cell and separately identify the transmission or fluorescence of each cell. During fabrication of the small-scaled plate, the concept relates to the relative positioning between a device, such as a fabrication device, and the design location of the cells of the small-scaled plate as set forth in the design plans.

micromachining any process designed to form microstructures on a substrate.

structure a "structure" formed on the upper surface of a plate is a shape defined by variations in the elevation of the upper surface. Preferably, structures are "microstructures" having dimensions of about 2 mm or less.

DETAILED DESCRIPTION

The small-scaled plate 100 of the invention is formed of a substrate that is an organic or inorganic material that is suitable for forming the fine structures described herein. The small-scaled plate 100 should be formed of a material that is resistant to the types of materials it is anticipated to encounter in use. Thus, for instance, in diagnostic settings the small-scaled plate 100 typically encounters aqueous materials and can, accordingly, be manufactured of a broad range of materials. Where the small-scaled plate 100 is designed for use in synthetic reactions, often the 100 should be constructed of a material that is resistant to acids, bases and solvents. In one preferred embodiment, the small-scaled plate 100 is constructed of glass, particularly borosilicate glass.

Figure 1:
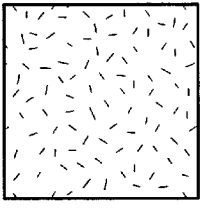
FIG. 1 depicts four formats for the plate of the invention.

A basic parameter for the small-scaled plate 100 is the spacing between the centers of adjacent cells 101, which spacing is termed the "pitch." Four cell formats for plates are illustrated in FIG. 1; these formats are the 1K, 4K, 10K and 100K formats. The 1K format has a pitch of 2260 μm; the 4K format has a pitch of 1488 μm; the 10K format has a pitch of 965 μm; and the 100K format has a pitch of 558 μm. Illustrative parameters for these formats are set forth below:

| | FORMAT | | | |
|---|---|---|---|---|
| | 1K | 4K | 10K | 100 K |
| NUMBER OF CELLS | 32 × 32 = 1024 | 64 × 64 = 4096 | 100 × 100 = 10,000 | 316 × 316 ≈ 100,000 |
| SUBSTRATE SIZE | 3 inch square | 4 inch square | 4 inch square | 7.25 inch square |
| CELL SIZE | 890 μm square | 890 μm square | 635 μm square | 635 μm square |
| CELL | 2260 μm | 1488 μm | 965 μm | 558 μm |

-continued

| | FORMAT | | | |
|---|---|---|---|---|
| | 1K | 4K | 10K | 100 K |
| PITCH | | | | |
| MIN. CELL VOLUME | 120 nL | 120 Nl | 50 Nl | 10 nL |
| MIN. CELL DEPTH | 200 μm | 200 μm | 200 μm | 150 μm |

In the illustration, cell volume and depth are selected to help accommodate the insertion of beads on which synthetic or other chemistries are conducted.

Preferably, the reaction cells are rectangular with a width of about 400 microns to about 1200 microns, more preferably about 500 microns to about 1000 microns, yet more preferably about 640 microns, and a depth of about 200 microns to about 400 microns.

Focusing on the 1K format, the pitch is the 2260 μm distance illustrated in FIG. 1. The area defined by the pitch further defines the amount of surface area that a given cell 101 resides within. Thus, the product of the pitch between cells 101 in a row and the pitch between cells 101 in a column determines the size of the surface area on which an individual cell 101 sits. The percentage of this surface area taken up by the area of each of the cell apertures is the area of the cell openings divided by the above-described product, times 100%.

It is useful in understanding how the small-scaled plate is used, to refer to Zanzucchi et al., "Liquid Distribution System," U.S. patent application Ser. No. 08/556,036, filed Nov. 9, 1995, which application is incorporated herein in its entirety by reference. This patent application describes a liquid distribution system ("LDS") that can deliver fluid from a number of reservoirs to all of a set of reaction cells that are connected to the LDS and from additional reservoirs to a substantial subset of these reaction cells. The liquid distribution device is designed for use in applications requiring a high density of reaction cells. In a preferred embodiment, the device uses electrode-based pumps that have no moving parts to transport fluid from the reservoirs to the reaction cells. The reaction cells are preferably found on a plate 100 that is separable from the portion of the liquid distribution system containing reservoirs and pumps. The separable plate 100 docks with the liquid distribution system, typically with a gasket material (that has openings at appropriate locations) interposed between the two, so that the cells are aligned underneath the appropriate outlet for delivering liquid from the liquid distribution system.

Three parameters that are basic to the format of the plate 100 are the spacing between cells 101 (i.e., pitch), the area of each of the openings of the cells 101 which will be referred to as the cell aperture, and the row-column arrangement which will be referred to as the matrix layout. The depth of a cell 101 can be made to vary according to the application for which the plate 100 is used. Structures required for support functions can be formed on the area between cell apertures.

The determination of pitch is based on factors including the following:

size of the substrate;
  surface area required by the cell aperture;
  allowing adequate surface area for the mechanical and electrical architecture for features and devices that direct and control fluids to be introduced into the cells 101;

allowing adequate surface area for sealing to ensure the isolation of fluids;

allowing for practical mechanical resolution in processes for loading and unloading materials such as fluids, beads and pellets;

compatibility with a means of illuminating each cell 101 in an individual and addressable manner for the reaction detection process;

compatibility with a means of sensing, for each cell 101 individually, that a desired reaction has taken place;

compatibility with fabrication techniques such as photolithography, micromachining, electroforming and pressure molding; and structural integrity of the substrate.

The determination of cell aperture is based on factors including the following:

selecting an appropriate size to provide an adequate reagent fluid volume needed for the chemical reaction that is designed to take place in the cell 101;

selecting an adequate size to provide reliable flow of reagent fluids through the cell 101, where this determination should take into account the possibility that the cell 101 contains a solid support media or bead 102;

limitations on available surface area due to the selection of the best compromise between smaller cell pitch (thus greater cell density) and larger cell aperture (thus, greater cell volume and accessibility);

allowing for entry by instruments for loading and unloading materials such as fluids, beads and pellets;

allowing the cell to be accessed by reagents used to add a functionality to the surface of the cell, such as siliconizing agents used to minimize surface adsorption or control the wetting properties of the surface;

compatibility with a means for illuminating each cell 101 individually;

compatibility with a means for detecting reaction in each cell 101 individually;

compatibility with fabrication techniques such as photolithography, micromachining, electroforming and pressure molding; and structural integrity of the substrate.

The determination of the matrix layout is based on factors including the following:

the needs of the experimental, diagnostic, screening or synthesis procedure to be conducted in the small-scaled plate 100;

the need to efficiently use the surface area of the substrate;

efficiency and density of the reagent fluid circuit of the liquid distribution system that interacts with the small-scaled plate;

convenient addressability of each cell 101;

compatibility with a means for illuminating each cell individually; and compatibility with a means for detecting reaction for each cell individually.

Figure 2:
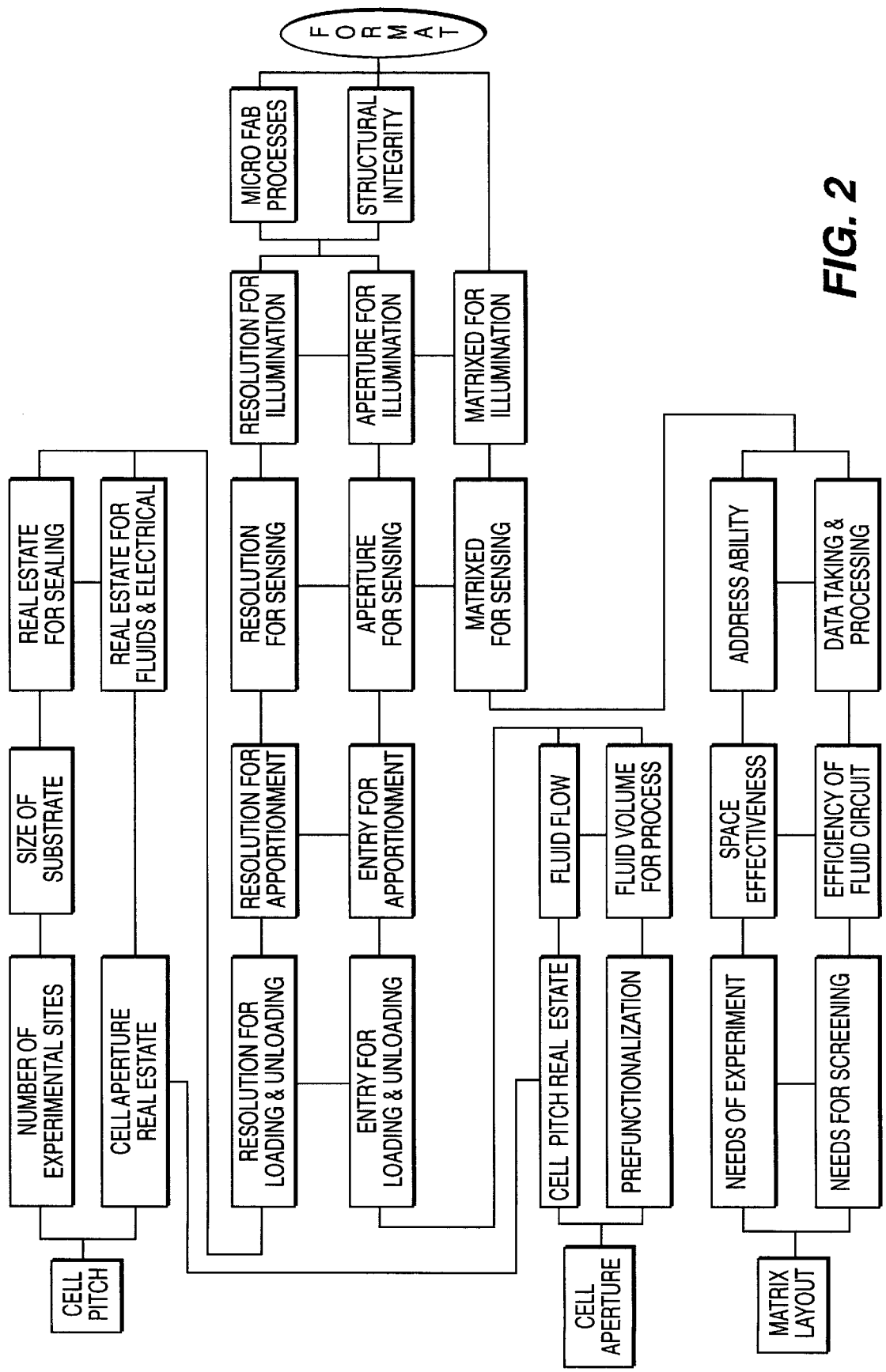
FIG. 2 shows schematically some of the parameters considered in designing the format of the plate of the invention.

An algorithm used for addressing the best compromise of these variables is illustrated graphically in FIG. 2, with the connecting lines indicating inter-related concepts relating to cell pitch, cell aperture and matrix layout that should be considered in arriving at a format.

Designs of particular interest can be met by the matrix formats of 1,000 cells 101 represented by a matrix of 32×32=1,024 cells 101; 4,000 cells 101 represented by a matrix of 64×64=4,096 cells 101; and 10,000 cells 101 represented by a matrix of 100×100=10,000 cells 101. Such Designs are illustrated in FIG. 1. Intermediate formats covering a different number of cells 101, and asymmetric matrix layouts can also be fabricated. Some design considerations that went into the formats of FIG. 1 are outlined below.

Format 1K

Format 1K is a 1024 cell array symmetrically formed into 32 rows and 32 columns and having a reaction cell volume of at least about 120 nanoliter per cell 101. The substrate size has been selected by balancing the pressures toward minimum size imposed by handling and fluidics factors and the pressures for maximum size imposed by ease of fabrication considerations. Using approaches that most reflect the performance implied by this format, a substrate size of 3 inch×3 inch has been selected as the best compromise. For this size and array configuration, in a typical case, a cell pitch of 2260 $\mu$m can be accommodated. A cell configuration that satisfies volumetric and surface area requirements for fluid delivery, synthesis, assay and detection is 890 $\mu$m×890 $\mu$m. Using typical micromachining techniques suitable for production (for example see the description below of such a technique), the cells 101 have a fluid capacity of a minimum of 120 nanoliters.

Format 4K

Format 4K is a 4096 cell array symmetrically formed into 64 rows and 64 columns and having a reaction cell volume capacity of at least about 120 nanoliter per cell 101. As above, a compromise between operation, handling and fabrication has led to the selection of a substrate size of 4 inch×4 inch. For this size and array configuration, in a typical case, a cell pitch of 1488 $\mu$m can be accommodated. The cell configuration of 890 $\mu$m square of the 1K format, which configuration satisfies volumetric and surface area requirements for fluid delivery, synthesis, assay, and detection, can be maintained. Using typical micromachining techniques suitable for production, the cells 101 have a fluid capacity of a minimum of 120 nanoliters.

Format 10K

Format 10K is a 10,000 cell array symmetrically formed into 100 rows and 100 columns. A maximum of 4 inch×4 inch substrate size was selected for handling and fabrication reasons. Micromachined features are reduced in size from the 4K cell format. For use with this 10K plate, the associated liquid distribution system, for instance a liquid distribution system according to Zanzucchi et al.,"Liquid Distribution System," U.S. patent application Ser. No. 08/556, 036, filed Nov. 9, 1995, is also fabricated with a correspondingly dense layout of fluid delivery capillaries. With such a dense layout of fluid delivery capillaries, a cell pitch of 965 $\mu$m in the small-scaled plate can be accommodated. The cell configuration is adjusted for the more demanding requirements created by the higher density of cells. A useful resolution of the volumetric and surface area requirements for fluid delivery, synthesis, assay and detection, is 635 $\mu$m×635 $\mu$m cell aperture. Using micromachining techniques suitable for production, the cells 101 have a fluid capacity of a minimum of 50 nanoliters.

The reaction cell aperture is preferably substantially square or rectangular in profile to best accommodate an array format. The aperture can have rounded corners to accommodate the micromachining or molding/replication techniques used. Thus, "substantially" in this context means no more than the amount of rounding or irregularity in shape that can be expected when such structures are formed in glass by chemical etching, as predominately practiced commercially in 1995. Preferably, the circular features formed at the edges of the "rectangular" or "square" cells have radii no greater than the depth of the cell and the edges of the aperture of the cell are longer than the cell depth.

Figure 3:
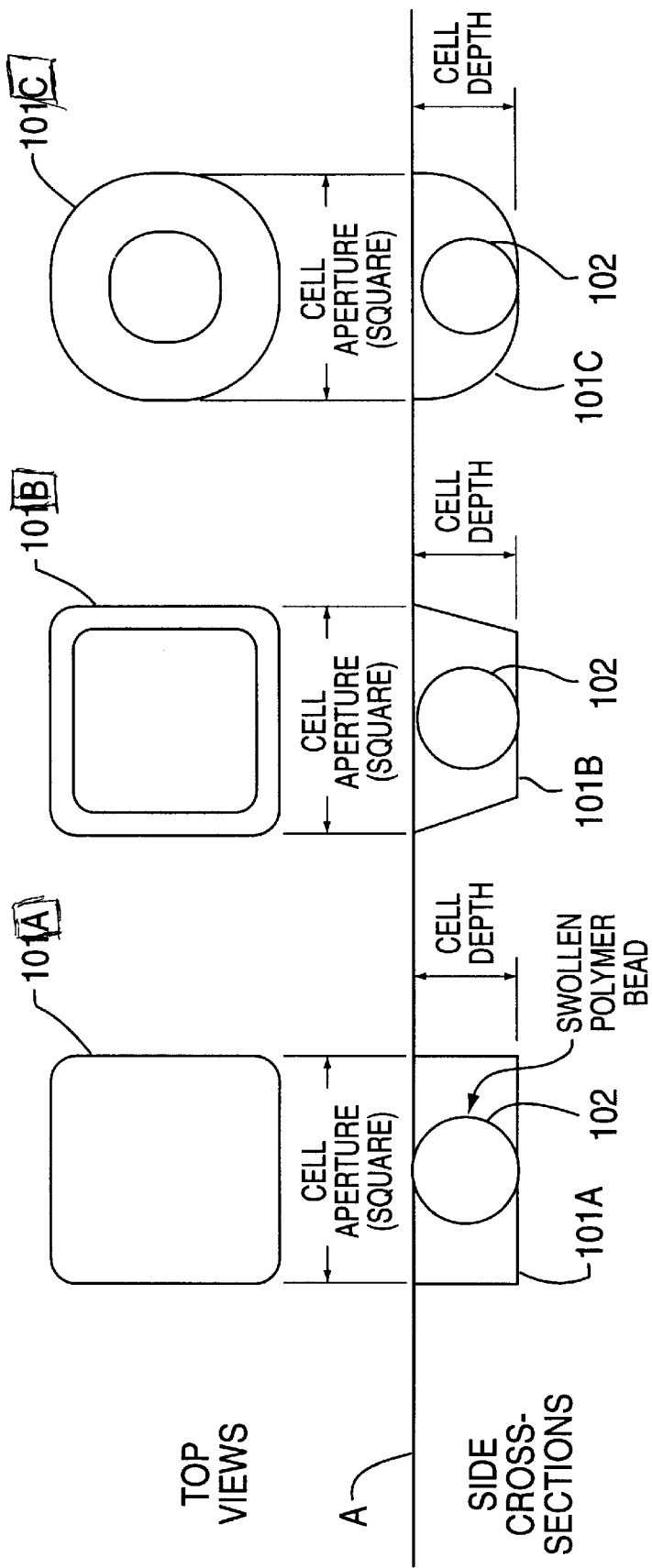
FIGS. 3A–3C show three cell designs.

In FIG. 3, above line A are shown three top views for three different cell 101 designs (first cell 101A, second cell 101B and third cell 101C). Below line A are shown the side profiles of first cell 101A, second cell 101B and third cell 101C. The profile of first cell 101A illustrates the relatively sharp edge lines obtained by chemically etching a silicon substrate. The profile of second cell 101B illustrates the relatively sharp edge lines obtained by laser etching a glass substrate. When chemically etching a glass substrate, the lines obtained are typically less sharp, as illustrated in FIG. 3C. The cell 101 cross-sectional profile can be of various shapes depending on the micromachining or replication technique but should preferably meet a minimum fluid volume capacity and must provide enough depth to accommodate experiments that require a bead 102 for use in syntheses or assays that require a solid support. Although a number of beads per cell may be used, and although beads of different sizes may be used depending on the experiment, the preferred design consideration is based on providing adequate space for synthesis or other reaction on a single bead of a defined maximum specified swollen diameter. In one use of the nanoliter plates, cell depths sufficient to accommodate swollen beads of 200 $\mu$m diameter are used in formats 1K, 4K, 10K; and depths sufficient to accommodate swollen beads of 100 $\mu$m diameter are used in format 100K.

The cell profile is achieved with micromachining, replicating, molding, or like fabrication methods, cells in a single substrate, or is achieved by combining multiple layers of substrates. The combining of layers can be achieved by known methods or, with appropriate substrates, with the field-assist sealing method described in Zhonghui H. Fan et al., U.S. Provisional Application No. P-89,876, titled "Field Assisted Glass-Glass Sealing," filed Nov. 7, 1995, which is incorporated herein in its entirety by reference. When the small-scaled plate is used for detection, optical requirements are important variables in the selection of cell construction, cross-sectional profile, and material. The small-scaled plate allows for the space between cells to be used to provide for fluid conduits and drains, electrical vias, sealing features, and the like. The small-scaled plate can be constructed of any materials, material combinations, substrate thicknesses, and fabrication techniques, that suit the application.

Figure 4:
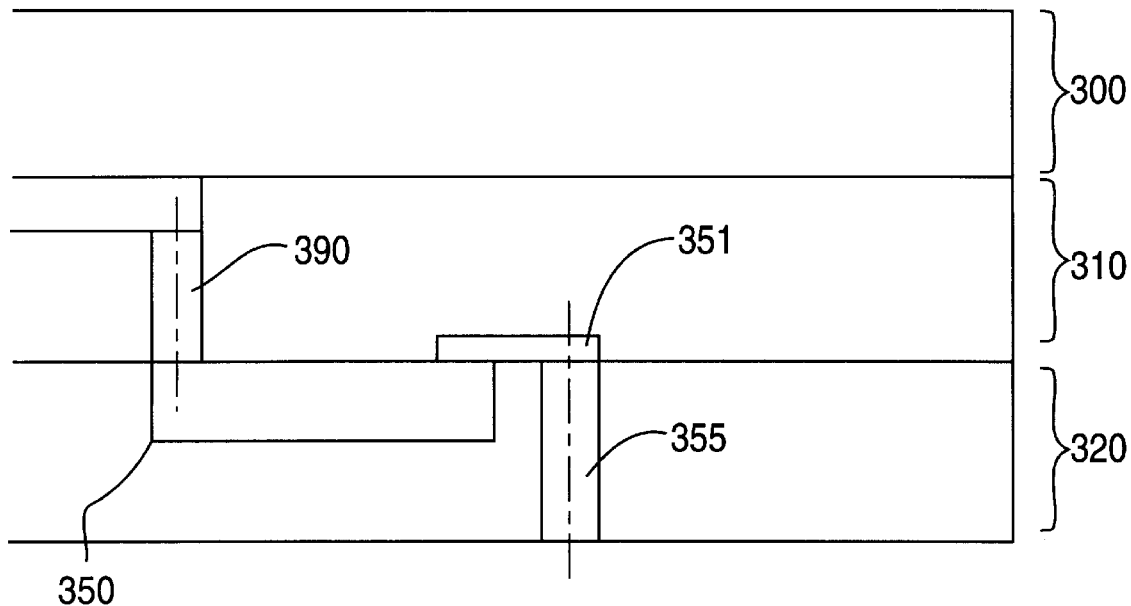
FIG. 4 illustrates a plate of the invention connected to a liquid distribution system.

FIG. 4 illustrates one way the surface area between cell apertures can be used. The small-scaled plate 320 is formed of a single plate and has formed thereon cells 350. The small-scaled plate 320 is designed for use with a liquid distribution system ("LDS") formed of first LDS plate 300 and second LDS 310. Liquid is delivered to each cell 350 through a first conduit 390. Excess fluid flows out through second conduit 355, which connects to cell 350 through third conduit 351.

Provision is preferably made on the small-scaled plate 100 to facilitate alignment (a) with the apparatuses that fabricate the small-scaled plate, and during assembly (b) with liquid distribution systems and other processing or detection equipment. For many cases mechanical alignment using three-pin registry is acceptable, and the edge alignment locations specified in FIG. 5 can be used. Although other alternatives can be used, the preferred method is to grind first edge notch 105A, second edge notch 105B and third edge notch 105C, for instance at the locations shown in FIG. 5. The use of such notches obviates the need to accurately machine all the edges of the small-scaled plate 100 and provides for a method of mechanically identifying the top and bottom of the plate 100. The location of the center of the cell patterns is defined in FIG. 5 by the intersection of lines B and C. The use of comparable notches in the manufacture of a liquid distribution system with which the small-scaled plate operates allows equipment and tool manufacturers to coordinate their designs.

Figure 5:
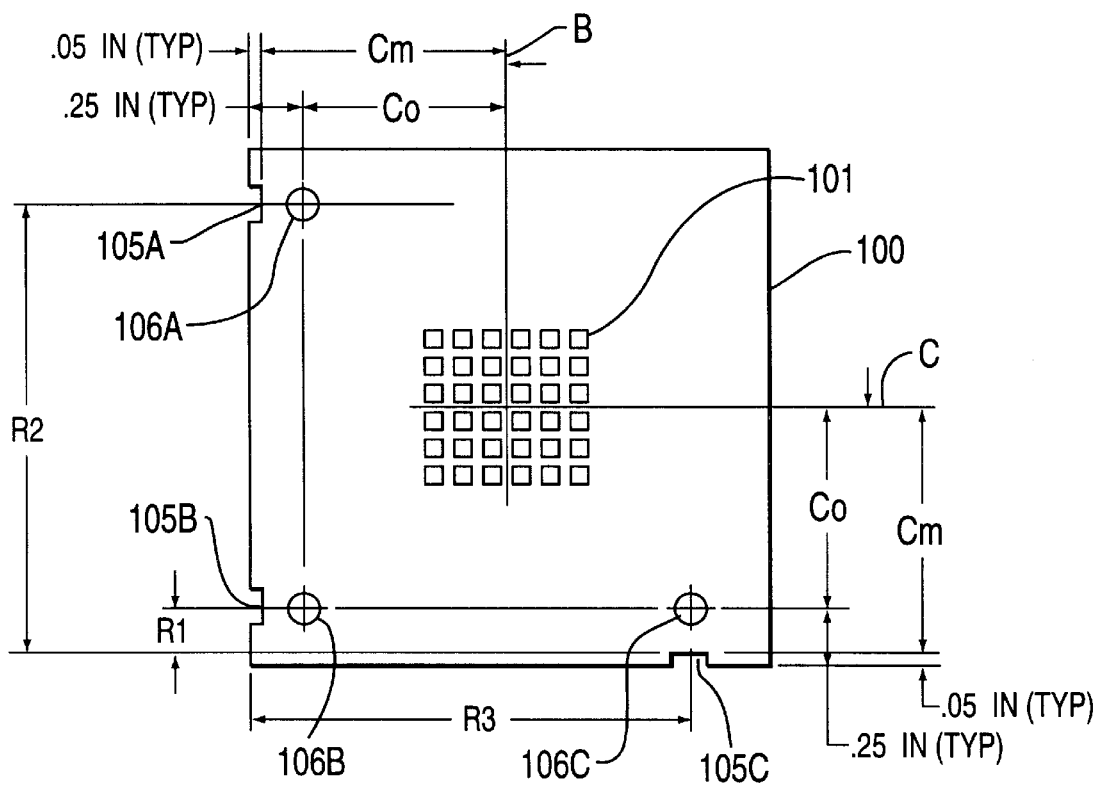
FIG. 5 shows a plate of the invention.

In the illustrated small-scaled plate of FIG. 5, examples of the distances represented by R1, R2, R3, Cm and Co are:

| FORMAT | R1 | R2 | R3 | Cm | Co |
|--------|---------|---------|---------|---------|---------|
| 1K | 0.25 in | 2.70 in | 2.70 in | 1.45 in | 1.25 in |
| 4K | 0.25 in | 3.70 in | 3.70 in | 1.95 in | 1.75 in |
| 10K | 0.25 in | 6.95 in | 6.95 in | 3.57 in | 3.37 in |

In some cases, optical alignment is preferable. The preferred location for the optical fiducials, such as first fiducial 106A, second fiducial 106B and third fiducial 106C, are illustrated in FIG. 5.

For all of the above-described embodiments, the preferred support material will be one that has shown itself susceptible to microfabrication methods, such as a microfabrication method that can form channels having cross-sectional dimensions between about 50 microns and about 250 microns. Such support materials include glass, fused silica, quartz, silicon wafer or suitable plastics. Glass, quartz, silicon and plastic support materials are preferably surface treated with a suitable treatment reagent such as a siliconizing agent, which minimizes the reactive sites on the material, including reactive sites that bind to biological molecules such as proteins or nucleic acids. In embodiments that require relatively densely packed electrical devices, a non-conducting support material, such as a suitable glass, is preferred. Preferred glasses include borosilicate glasses, low-alkali lime-silica glasses, vitreous silica (quartz) or other glasses of like durability when subjected to a variety of chemicals. Borosilicate glasses, such as Corning 0211, 1733, 1737 or 7740 glasses, available from Corning Glass Co., Corning, N.Y., are among the preferred glasses.

The reaction cells and horizontal channels and other structures of the small-scaled plates can be made by the following procedure. A plate is coated sequentially on both sides with, first, a thin chromium layer of about 500Å thickness and, second, a gold film about 2000 angstroms thick in known manner, as by evaporation or sputtering, to protect the plate from subsequent etchants. A two micron layer of a photoresist, such as Dynakem EPA of Hoechst-Celanese Corp., Bridgewater, N.J., is spun on and the photoresist is exposed, either using a mask or using square or rectangular images, suitably using the MRS 4500 panel stepper available from MRS Technology, Inc., Acton, Mass. After development to form openings in the resist layer, and baking the resist to remove the solvent, the gold layer in the openings is etched away using a standard etch of 4 grams of potassium iodide and 1 gram of iodine ($I_2$) in 25 ml of water. The underlying chromium layer is then separately etched using an acid chromium etch, such as KTI Chrome Etch of KTI Chemicals, Inc., Sunnyvale, Calif. The plate is then etched in an ultrasonic bath of HF—$HNO_3$—$H_2O$ in a ratio by volume of 14:20:66. The use of this etchant in an ultrasonic bath produces vertical sidewalls for the various structures. Etching is continued until the desired etch depth is obtained. Vertical channels are typically formed by laser ablation.

The gasket used to reversibly seal the plate to an instrument that functions with the plate can be attached to the plate, leaving openings for the cells and other structures, as needed. One method of attaching the gasket is screen-printing. The printed gasket can be made of silicone or another chemically-resistant, resilient material.

Alternatively, a multi-step compression-molding process that utilizes photolithography can be applied. First, the top surface of the plate, on which generally cells and other structures have been formed, is coated with a photoresist. Preferably, the photoresist layer is about 1 mil in thickness. The photoresist layer is treated by standard photolithography techniques to remove photoresist from those areas (the "gasket areas") away from the apertures of the cells where gasket material is desired. A layer of a flowable gasket material that can be cured to a resilient, elastomeric solid is applied. A platen having a polished surface, for instance a polished glass surface, is placed above the gasket material and pressure is applied to push the gasket material into the gasket areas and substantially clear the gasket material from the photoresist-coated areas. The gasket material is now cured. The photoresist is then dissolved, leaving the plate with a patterned gasket. The gasket material is substantially cleared if it is sufficiently cleared to allow the underlying photoresist to be dissolved.

In this process, the gasket material is any elastomeric material that is suitable for use in the above-described compression molding technique, that is, when cured, compatible with the chemistries that are to be practiced in the plate on which the gasket is formed, and that is, when cured, resistant to the solvents used to remove the photoresist. The gasket material is preferably silicone, such as RTV type silicone rubber (e.g., Silastic J, RTV Silicone Rubber available from Dow Corning, Midland, Mich.). The photoresist can be a film-type photoresist such that typically the structures on the plate will not be filled during the compression-molding process or a liquid-type photoresist such that the structures will temporarily be filled during the compression-molding process and etched away at the completion of the process. In some instances, it is desirable to treat the plate, prior to the application of the photo-resist, with a primer for promoting the adhesion of the gasket material, such as 1200 RTV Prime Coat from Dow Corning, Midland, Mich. The plate can also be roughened to promote the adhesion of the gasket material to the plate. For example, 5 micron roughness can be produced by lapping. The platen is preferably treated with a release-promoter, or a release promoter is incorporated into the gasket material, as it is in Silastic J silicone rubber. The compression-molding process can leave thin residues of gasket material at unwanted locations. These residues are laser cut away from the plate or, in some cases, are removed using a timed exposure to a solvent that dissolves the thin film of exposed gasket material residue without having substantial effect on the thicker layer of gasket material found at desired locations.

What is claimed:

1. A processing system for conducting a plurality of processes in parallel, the processing system comprising a liquid distribution system for directing liquids to a plurality of uniformly sized reaction cells, and a plate comprising said cells, the plate is reversibly and sealably attached to the liquid distribution system, having a plurality of the reaction cells formed in its upper surface and having seal-forming surfaces surrounding the reaction cells for sealing with the liquid distribution system and thereby isolating reaction cells from adjacent reaction cells, wherein the density of the reaction cells is at least about 10 cells per $cm^2$, wherein reaction cells are separated from each adjacent reaction cell by at least about 0.15 mm, wherein the plate can engage the liquid distribution system such that a plurality of said cells can receive liquid from the liquid distribution system without having to adjust the engagement between the plate and the liquid distribution system and wherein the area of each of the openings of the reaction cells of the plate is no more than about 50% of the area defined by the multiplication product of (1) the pitch between reaction cells in separate rows and (2) the pitch between reaction cells in separate columns.

2. The processing system of claim 1, wherein the cells are arrayed in rows and columns.

3. The processing system of claim 1, wherein the plate is rectangular.

4. The processing system of claim 1, wherein the area of each of the openings of the reaction cells is no more than about 45% of the area defined by the multiplication product of (1) the pitch between reaction cells in separate rows and (2) the pitch between reaction cells in separate columns.

5. The processing system of claim 1, wherein the reaction cells are rectangular with a width of about 400 microns to about 1200 microns.

6. The processing system of claim 1, wherein the reaction cells have a depth of about 200 microns to about 400 microns.

7. The processing system of claim 1, wherein the density of cells is at least about 20 cells per $cm^2$.

8. The processing system of claim 1, wherein the density of cells is at least about 40 cells per $cm^2$.

9. The processing system of claim 1, wherein the pitch between reaction cells in a row or column is at least about 0.5 mm.

10. The processing system of claim 1, wherein each reaction cell is separated from each adjacent reaction cell by at least about 0.3 mm.

11. The processing system of claim 1, wherein each reaction cell has a substantially square shape.

12. The processing system of claim 1, wherein the plate has at least about 1,000 reaction cells.

13. The processing system of claim 1, wherein the plate has at least about 4,000 reaction cells.

14. The processing system of claim 1, further comprising two optical reference structures for orienting the reaction cells with respect to the liquid distribution system or a detection device designed to operate with the plate.

15. The processing system of claim 1, wherein liquid distribution system operates to addressably direct a plurality of liquids to the plurality of reaction cells.

16. A method of conducting a plurality of reactions in parallel in the processing system of claim 15, comprising operating the liquid distribution system for addressably directing a plurality of liquids to the plurality of cells, wherein the plate with the wells is reversibly sealed with a defined alignment to the liquid distribution system.

17. The processing system of claim 1, further comprising a first alignment marker on a first edge of the plate and a second alignment marker on a second edge of the plate perpendicular to the first edge, wherein the first and second alignment markers are for orienting the reaction cells with a liquid distribution system or a detection device designed to operate with the plate.

18. The processing system of claim 12, wherein the first and second alignment markers are notches at the edges of the plate designed to interact with locating pins used to mechanically orient the reaction cells.

19. The processing system of claim 12, further comprising a third alignment marker on the second edge, wherein the third alignment marker is for orienting the reaction cells with the liquid distribution system or a detection device designed to operate with the plate and is offset from the second alignment marker.

20. The processing system of claim 19, wherein the first, second and third alignment markers are notches designed to interact with locating pins used to mechanically orient the reaction cells.

21. The processing system of claim 20, wherein the optical reference structures are etched into the plate.

* * * * *